July 5, 1955          A. BECHT          2,712,151
DETACHABLE HANDLE FOR A UTENSIL
Filed Oct. 22, 1951
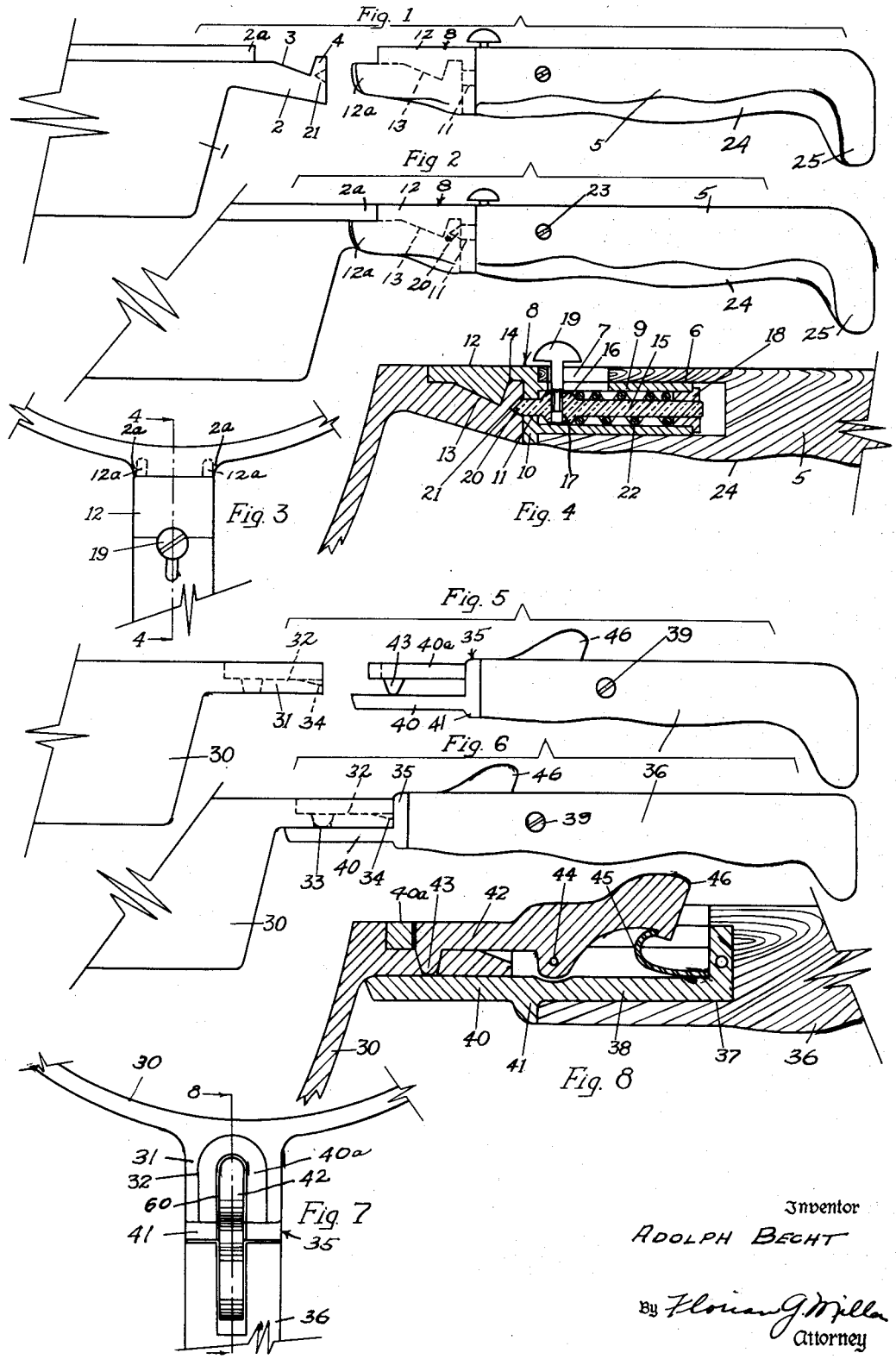
Inventor
ADOLPH BECHT
By Florian G. Miller
Attorney

# United States Patent Office 2,712,151
Patented July 5, 1955

2,712,151

DETACHABLE HANDLE FOR A UTENSIL

Adolph Becht, Erie, Pa.

Application October 22, 1951, Serial No. 252,487

3 Claims. (Cl. 16—114)

This invention relates generally to utensil handles and more particularly to detachable handles for cooking utensils.

Most frying pans, kettles, and the like, especially those made of cast metal, have a handle formed as part thereof. These handles conduct heat and the ordinary woman must use her two hands to lift a utensil because of the size and shape of the handle. Pads are now necessary in lifting hot utensils and, in many instances, the pads slip and the hand is burned and the pan or kettle is dropped. The handles on present cooking utensils also take considerable space on the top of a stove.

It is, accordingly, an object of my invention to provide a detachable handle for a utensil which is simple in construction, economical in cost, economical in manufacture, and efficient in operation.

Another object of my invention is to provide a detachable handle for a utensil which is easily attachable and detachable and which firmly holds the utensil in an upright, obverse, or sidewise position.

Another object of my invention is to provide a releasable handle for a utensil which is easily gripped, which is non-heat conducting, and which permits conservation of space on a stove or in the storage of utensils.

Other objects of my invention will become evident from the following detailed description, taken in conjunction with the accompanying drawings, in which:

Fig. 1 is an exploded side elevational view of a preferred form of my novel cooking utensil handle;

Fig. 2 is a side elevational view of my novel detachable handle for a cooking utensil attached to a lug on a cooking utensil;

Fig. 3 is a fragmentary plan view of my novel detachable handle connected to a cooking utensil;

Fig. 4 is a view taken on the line 4—4 of Fig. 3 with the handle connected to the lug;

Fig. 5 is an exploded side elevational view of a modified form of my novel detachable handle for a cooking utensil;

Fig. 6 is a side elevational view of the detachable handle shown in Fig. 5 attached to a lug on a cooking utensil;

Fig. 7 is a fragmentary plan view of the detachable handle and connecting lug shown in Figs. 5 and 6; and Fig. 8 is a view taken on the line 8—8 of Fig. 7.

Referring now to the drawings, I show in Figs. 1 to 4 inclusive a cooking utensil 1 having a lug 2 extending radially outwardly from one side thereof, the lug 2 having an offset, transverse, cutaway portion 3, an upwardly extending transverse portion 4, and oppositely disposed, overhanging side portions 2a. A detachable handle 5 has an axial bore 6 in one end thereof with a laterally extending slot 7. A connecting member 8 has a sleeve 9 which extends into the axial bore 6, a transverse face 10 with a central aperture 11, and an outwardly projecting portion 12 with a cutaway, offset underside 13. The outwardly projecting portion 12 is formed to correspond in shape to the lug 2 whereby they complement each other and there is interengagement as shown in Fig. 4. The lug 2 nests in the cutaway portion 13 of the projecting portion 12. The upwardly extending portion 4 on the lug 2 nests in the transverse recess 14 in the portion 12 of the connecting member 8. The projecting member 12 has outwardly extending, projecting portions 12a on opposite sides thereof which hook underneath the overhanging portions 2a on the lug 2. A shaft 15 is disposed axially of the sleeve 9, the shaft 15 having an enlarged guiding portion 16 with a transversely extending aperture 17 slidable in the sleeve 9 for guidance of the shaft 15 axially in the sleeve 9 and it has a flanged collar 18 attached to one end thereof and extending into an end of the sleeve 9. The shaft 15 has a headed pin 19 extending into the transverse aperture 17 in the guiding portion 16 and outwardly through the slot 7 in the handle 5. The shaft 15 has an outwardly extending, pointed end 20 adapted to extend into a recess 21 in the end of the lug 2 when the handle 5 and lug 2 are connected together as shown in Figs. 2, 3, and 4. A coil spring 22 is disposed between the enlarged portion 16 of the shaft 15 and the collar 18 to urge the end 20 of the shaft 15 into the recess 21 on the lug 2. A lock screw 23 secures the sleeve 9 in the bore of the handle 5. The handle 5 is made of a non heat conducting material such as wood, and for easy handling, it has arcuate shaped finger engaging portions 24 and a depending end 25.

The head portion of the pin 19 is engageable by the thumb of a person so that the shaft 15 may be moved longitudinally to remove the end 20 of the shaft 15 from the recess 21 to disengage the handle 5 from the lug 2.

When it is desired to connect the handle 5 to the lug 2, the thumb is placed on the head of the pin 19 and the shaft 15 is moved longitudinally against the force of the spring 22 to retract the shaft 15. The outwardly projecting portion 12 of the connecting member 8 is then engaged with the lug 2 with the upwardly projecting portion 4 of the lug 2 nesting in the transverse recess 14 in the portion 12 of the member 8 and the hook portions 12a hooking underneath the overhanging side portions 2a on the lug 2. The end 20 of the shaft 15 is retracted and the spring 22 urges the end 20 of the shaft 15 into the recess 21 in the lug 2. It will be evident that the cooking utensil 1 may be held in an upright position or in a sidewise position without the engagement of the end 20 of the shaft 15 with the recess 21 in the lug 2 inasmuch as there are ample bearing surfaces between the lug 2 and the connecting portion 8 of the handle 5 to hold the pan firmly in these positions. The pan or cooking utensil 1 can be held in any position after the end 20 of the shaft 15 engages the recess 21 in the lug 2. The handle 5 is released by retracting the shaft 15 and disengaging the end 20 of the shaft 15 from locking engagement with the recess 21 in the lug 2.

In the modified form of my invention shown in Figs. 5 to 8 inclusive, a cooking utensil 30 has a radially outwardly extending lug 31 with a radially extending cutaway portion 32 and a tapered aperture 33 centrally thereof. The end 34 of the lug 31 is tapered for easier connection by the connecting end 35 of a handle 36. The handle 36 has a recessed portion 37 in one end thereof for receiving the rounded end 38 of the connecting portion 35 of the handle 36. A locking screw 39 engages the end portion 38 to hold it in the recessed portion 37 of the handle 36. The connecting portion 35 has outwardly extending, parallel, upper and lower plates 40a and 40 and an intermediate collar 41 for abutting against the end of the handle 36. A latching member 42 tiltable in a slot 60 in the upper plate 40a has a depending portion 43 for engaging the aperture 33 in the lug 31 as shown particularly in Fig. 8 when the lug 31 and handle 36 are connected together. The latching member 42 is pivoted on a transverse shaft 44 and is engaged by an arcuate shaped spring member 45 which urges the pin 43 on the latching member 42 into the recess 33 in the lug 31 upon connection of the lug 31 and handle 36. The latching member 42 has a handle 46 which is engageable by the thumb of a person to tilt the latching member 42 and remove the pin 43 of the latching member 42 from the aperture 33 in the lug 31 to remove the handle 36 from the lug 31. The upper plate 40a is rounded to nest in the cutaway portion 32 of the lug 31.

In the modified form of my invention, the upper plate 40a is nested in the cutaway portion 32 of the lug 31 as shown in Fig. 8 with the lower plate 40 of the connecting member 35 engaging the bottom side of the lug 31 whereupon the projecting portion 43 of the latching member 42 is urged into the aperture 33 in the lug 31 to lock the handle 36 into engagement with the lug 31. The top and bottom faces of the plates 40 and 40a are flat to engage flat faced surfaces of the lug 31 to better secure the handle 36 on the lug 31. When it is desired to remove the handle 36 from the lug 31, it is merely necessary to press the handle 46 of the latching member 42 downwardly whereupon the pin 43 is moved out of the recess 33 in the lug 31 and the handle 36 is pulled outwardly from the lug 31.

It will be evident from the foregoing description that I have provided a novel handle which is non heat conducting so that it may be kept cool at all times, it is so designed that it will hold the cooking utensil in an upright position, an upside down position, or in a sidewise position without any detachment of the handle from the lug on the cooking utensil, and attachment and detachment is extremely simple while it is still safe.

Various changes may be made in the specific embodiment of my invention without departing from the spirit thereof or from the scope of the appended claims.

What I claim is:

1. In combination, a lug on a cooking utensil having an open top having a transverse cutaway portion forming a transversely extending groove in the top of said lug extending across said lug from edge to edge thereof, said groove terminating at one edge thereof in an upwardly and transversely extending portion, a handle having the lower portion of one end thereof cut away to nest said lug on said utensil, said handle having a downwardly extending portion received in said groove and engaging said upwardly and transversely extending portion, one surface of said cutaway portion on said handle engaging the end of said lug, and means to hold said handle in place on said utensil.

2. The combination recited in claim 1 wherein said locking means comprises a recess in the end of said lug, a longitudinally movable latch shaft in said handle for lockingly engaging the recess in said lug, and means for moving said shaft from said recess.

3. In a combination as set forth in claim 2 wherein said latching shaft is spring urged and it has an upwardly extending pin attached thereto extending outwardly through an elongated slot in said handle and it is engageable by the thumb of a person to move said latching shaft axially of said handle.

References Cited in the file of this patent

UNITED STATES PATENTS

| 324,671 | Drake | Aug. 18, 1885 |
| 1,044,253 | Sampley | Nov. 12, 1912 |
| 1,268,089 | Borsse | June 4, 1918 |
| 1,364,552 | Hill, Jr. | Jan. 4, 1921 |
| 1,365,703 | Kolb | Jan. 18, 1921 |
| 1,707,231 | Morin | Apr. 2, 1929 |
| 2,162,961 | Mattoon | June 20, 1939 |

FOREIGN PATENTS

| 936,046 | France | Feb. 16, 1948 |